United States Patent [19]

Westhusin

[11] Patent Number: 4,846,375

[45] Date of Patent: Jul. 11, 1989

[54] PAINT SUPPLY WELL ASSEMBLY

[76] Inventor: Daryl L. Westhusin, 444 Gomez Ct., Sparks, Nev. 89461

[21] Appl. No.: 189,724

[22] Filed: May 3, 1988

[51] Int. Cl.$^4$ .............................................. G01F 11/26

[52] U.S. Cl. ................................. 222/185; 222/465.1; 401/120

[58] Field of Search ............... 222/185, 325, 457, 518, 222/561, 465–466; 401/120, 118

[56] References Cited

U.S. PATENT DOCUMENTS

| | | | |
|---|---|---|---|
| 573,129 | 12/1896 | Biorn | 222/457 X |
| 586,010 | 7/1897 | Burland | 222/457 |
| 1,248,746 | 12/1917 | Stewart | 401/120 X |
| 2,017,990 | 10/1935 | Ray | 222/457 |
| 3,042,267 | 7/1962 | Reynard | 222/185 |

FOREIGN PATENT DOCUMENTS

| | | | |
|---|---|---|---|
| 352172 | of 1922 | Fed. Rep. of Germany | 401/120 |
| 20763 | of 1902 | United Kingdom | 401/120 |
| 7331 | of 1906 | United Kingdom | 401/120 |

*Primary Examiner*—Michael S. Huppert
*Attorney, Agent, or Firm*—Phillip A. Rein

[57] ABSTRACT

This invention relates to a paint supply well assembly operable to be connected to a paint can member for the ready and controlled dispensing of liuid paint material therefrom. The paint supply well assembly includes (1) a main can support assembly; (2) a paint well assembly integral with the main can support assembly; and (3) a support handle assembly connected at one end to the main can support assembly at the opposite end forms a handle structure for transporting and conveyance purposes. The main can support assembly is provided with a cylindrical side wall member having an upper connector section adapted to receive and be interconnected to the open upper periphery of the paint can member. A paint well assembly is provided with a paint receiving assembly having a discharge opening which is selectively opened and sealed by a door closure assembly to achieve control flowing of the liquid paint material from the main can support assembly to the paint well assembly. The support handle assembly is provided with parallel first and second handle members each having an outer end thereof with a releasable connector member for interconnecting to each other for conveyance purposes. The slide door member is provided with a main body section with upper and lower flap portions to achieve sealing function when in the closed condition.

14 Claims, 2 Drawing Sheets

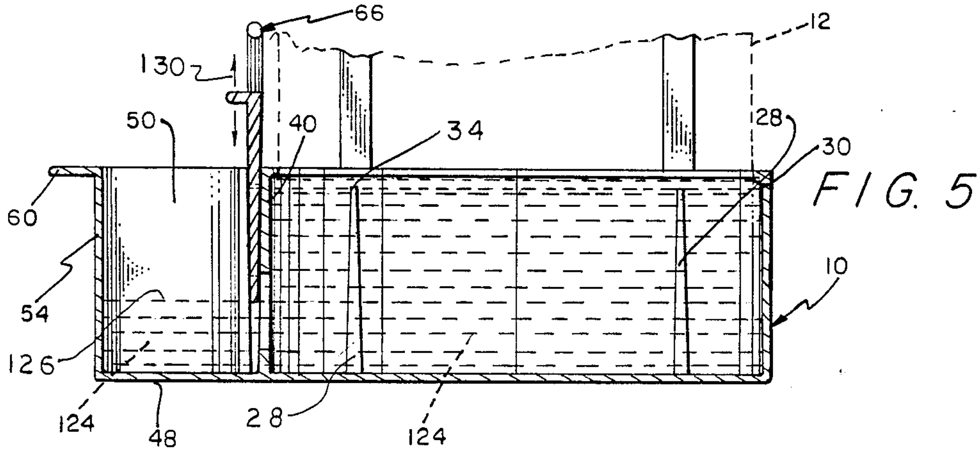
FIG. 5
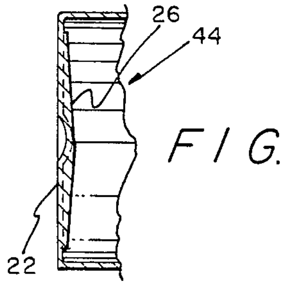
FIG. 6
FIG. 7
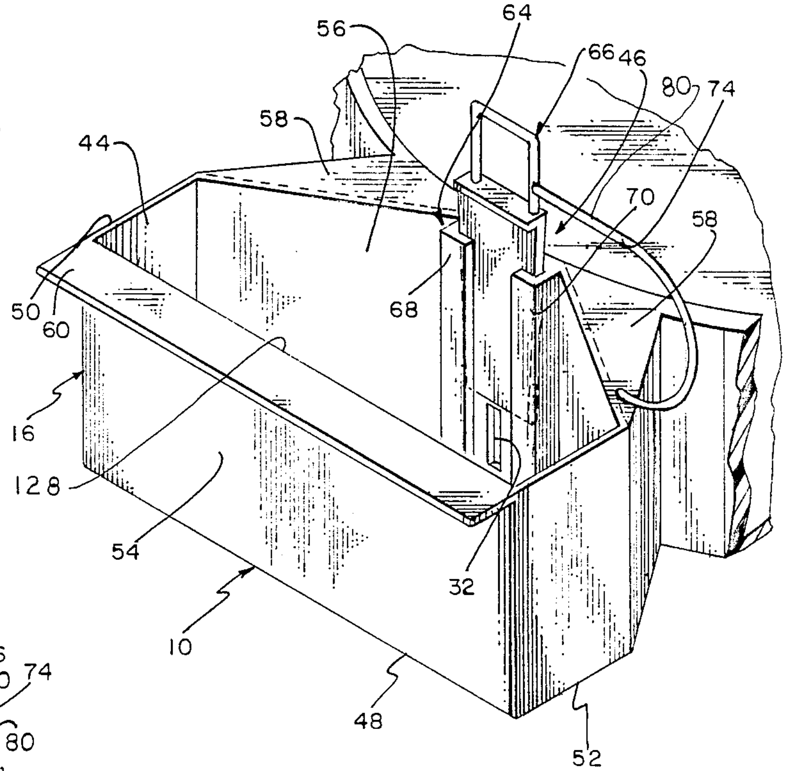
FIG. 8
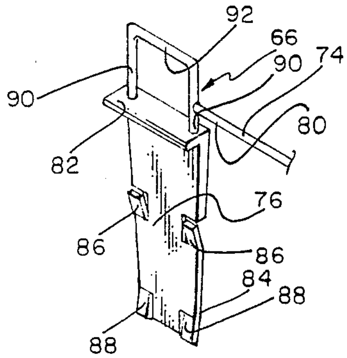
FIG. 9
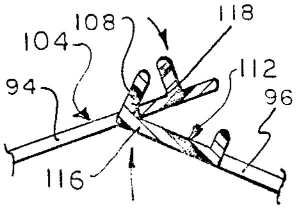

PAINT SUPPLY WELL ASSEMBLY

PRIOR ART

A patent search was not conducted on the above identified invention and, therefore, we have no knowledge of any prior art patents.

PREFERRED EMBODIMENT OF THE INVENTION

In one preferred embodiment of this invention, a paint supply well assembly is provided adapted to receive an opened paint can member thereon in an inverted condition for controlled dispensing of liquid paint therefrom for a brush painting operation. The paint supply well assembly includes (1) a main can support assembly; (2) a paint well assembly integrally connected to the main can support assembly; and (3) a support handle assembly connected to the main can support assembly and operable as a means of conveyance. The main can support assembly includes a can connector housing having a bottom wall integral with an upright cylindrical side wall member. A portion of the side wall member is provided with an upright discharge opening to selectively allow the liquid paint to flow therefrom into the paint well assembly. The paint well assembly includes a paint receiving assembly having a door closure assembly mounted between the same and the side wall member having the discharge opening therein. The paint receiving assembly is of generally rectangular shape and having an upper outer lip section to provide a means for wiping a paint brush thereon to remove excessive liquid paint therefrom. The door closure assembly includes a pair of spaced parallel door slide members having a slide door member mounted therein for vertical movement between opened and closed positions. The slide door member is provided with a main body section having a handle section connected thereto for ease of vertical movement. The main body section is provided with upper and lower flap portions to aid in sealing thereof. The main body section is of a downwardly tapered shape so as to provide a definite seal on movement to the closed condition within the door slide members. The support handle assembly includes first and second handle members, each having a lower end thereof connected to top portions of the main can support assembly. The first and second handle members are each provided with parallel main support straps interconnected at a mid portion by a transverse support member. The first handle member at its upper outer end is provided with a connector support member. The second handle member at its upper outer end is provided with an anchor connector member. The connector support member and the anchor connector member are operable to fit together with a snap type connection to releasably connect to each other plus provides a convenient handle portion for ease of conveyance of the entire paint supply well assembly with a paint can member connected thereto in an inverted condition. The main can support assembly is operable to receive the inverted paint can member therewithin in a sealed manner whereupon the door closure assembly and, more specifically the slide door member, is movable from opened to closed positions to allow liquid paint from the inverted paint can to move into the paint receiving assembly to provide a constant paint supply therein.

OBJECTS OF THE INVENTION

One object of this invention is to provide a paint supply well assembly adapted to be placed on a top open portion of a paint can member; then inverting subject paint can member; and having means thereon to control liquid paint flow from the paint can member outwardly to a paint well assembly for ease in a brush painting operation.

Another object of this invention is to provide a paint supply well assembly which can be constructed of various sizes to be utilized with paint can members and having a new and novel handle means for conveyance thereof.

One other object of this invention is to provide a paint supply well assembly easily connected to a paint can member for the controlled dispensing of paint liquid therefrom and overcomes the necessity for the standard conveyance of the paint can member through a pivotal wire handle member.

Still, another object of this invention is to provide a paint supply well assembly constructed of a plastic material which enables the same to be readily cleansed after each usage.

Another object of this invention is to provide a paint supply well assembly adapted to hold a paint can member thereon in an inverted position and having a door closure assembly with a slide door member which is readily movable from opened to closed positions and maintains a positive seal in the closed position.

One further object of this invention is to provide a paint supply well assembly which is economical to manufacture, sturdy in construction, reliable in operation, and substantially maintenance free.

Various other objects, advantages, and features of the invention will become apparent to those skilled in the art from the following discussion, taken in conjunction with the accompanying drawings, in which:

FIG. 5 is an enlarged fragmentary sectional view taken along line 5—5 in FIG. 1;

FIG. 6 is a fragmentary sectional view taken along line 6—6 in FIG. 2;

FIG. 7 is an enlarged fragmentary perspective view illustrating a door closure assembly of the paint supply well assembly of this invention;

FIG. 8 is a perspective view of a slide door member of the door closure assembly; and FIG. 9 is an enlarged fragmentary sectional view taken along line 9—9 in FIG. 1.

Figure 1:
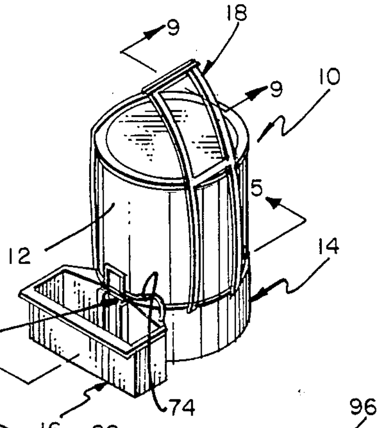
FIG. 1 is a perspective view of a paint supply well assembly of this invention illustrated as having an inverted paint can member mounted thereon.

The following is a discussion and description of a preferred specific embodiment of the new paint supply well assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, a paint or liquid supply well assembly of this invention, indicated generally at 10, is illustrated as having a gallon size paint or container can member 12 mounted thereon in an inverted usage condition. The paint supply well assembly 10 includes (1) a main can support assembly 14; (2) a paint or liquid well assembly 16 integrally connected to the main can support assembly 14; and (3) a support handle assembly 18 connected to an upper surface of the main can support assembly 14 and operable to provide a transport handle means therefore.

The main can support assembly 14 includes a can connector housing 20 having a bottom wall member 22 integral with an upright cylindrical side wall member 24. The bottom wall member 22 is provided with four spaced ridge members 26 operable to provide rigidity thereto. The side wall member 24 is provided with four spaced side ridge members 28; an upper connector section 30; and a paint discharge opening 32.

The side ridge members 28 are provided at the upper ends thereof with a can support section 34 adapted to receive and support the inverted paint can member 12 thereon as will be explained.

The upper connector section 30 is provided with an outwardly tapered portion 40 operable to aid in providing an important necessary seal with the inverted paint can member 12 in the usage condition as will be explained.

As noted in FIG. 7, the paint well assembly 16 which is connected to a portion of the side wall member 24 adjacent to the discharge opening 32 includes (1) a paint receiving assembly 44; and (2) a door closure assembly 46 mounted about the discharge opening 32 to control the flow of iquid paint into the paint well assembly 16.

The paint receiving assembly 44 includes a bottom well 48; a pair of opposed side walls 50, 52 integral and extended upright from the bottom wall 48; a front wall 54 integral along a lower edge with the bottom wall 48 and on the edges integral with the respective side walls 50, 52; an inclined V-shaped back wall 56 which is integral with the bottom wall 48 and the other upright edges of the side walls 50, 52; a connector wall 58 to connect the top edges of the back wall 56 to the upper edges of adjacent portion of the side wall member 24; and an outer lip section 60 integral with and extended horizontal and outwardly from the upper edge of the front wall 54.

The back wall 56 is integral with a portion about the discharge opening 32 where the flow of liquid paint from the paint connector housing 20 into the paint receiving assembly 44 is controlled through the door closure assembly 46 as will be noted.

As noted collectively in FIGS. 7 and 8, the door closure assembly 46 includes (1) a main door support assembly 64; and (2) a slide door member 66 mounted within the door support assembly 64 and adjustably movable from an opened to a closed sealed position as will be noted. The door support assembly 64 includes a pair of spaced L-shaped opposed door slide members 68 and 70. The door slide members 68, 70 are spaced at an equal distance from the discharge opening 32 and operable to seal the subject opening with the slide door member 66 in the closed condition.

The slide door member 66 includes (1) a connector member 74 for anchoring to the connector wall 58 of the paint receiving assembly 44; (2) a main body section 76 operable to achieve the sealing function to control liquid paint flow into the paint well assembly 16; and (3) a handle section 78 of generally U-shaped attached to a top portion of the main body section 76 for ease in grasping and moving between open and closed positions.

The connector member 74 is provided with a generally flexible tubular anchor portion 80 which assures that the slide door member 66 will remain in the immediate area when removed from connection with the parallel door slide member 68 and 70 for cleansing purposes.

The main body section 76 includes a top ridge portion 82 integral with a tapered body section 84 and having a pair of cooperating upper flap portions 86 and a pair of cooperating lower flap portions 88. The body portion 84 is tapered inwardly downwardly as noted in FIG. 8, from adjacent the top ridge portion 82 to a lower edge thereof.

The upper flap portions 86 are cutout portions operable to bias body portion 84 into a sealed condition with the side wall member 24 of the can connector housing 20 when in the closed condition to prevent liquid paint flow through the discharge opening 32 when in the closed or sealed condition.

The lower flap portions 88 form a similar function and are operable to bias a lower portion of the body portion 84 about the outer peripheral of the discharge opening 32 to achieve a further sealing function.

The handle section 78 is of a generally U-shape having parallel leg portions 90 interconnected at a lower edge to the top ridge portion 82 and interconnected at the upper ends by a top portion 92.

The support handle assembly 18 includes a first handle member 94 and a second handle member 96 which cooperate together to form a holding or transporting means for the entire paint supply well assembly 10 with the paint can member 12 attached thereto as noted in FIG. 1. The first handle member 94 includes a pair of parallel support straps 98 interconnected at a mid-portion by a transverse support member 102 and at upper outer ends thereof by a connector support member 104.

The connector support member 104 is a receiver section having a main connector body 106; a pair of snap connector grooves 108 at the outer edges of the main connector body 106; and a top ridge member 110 which provides a general function of adding reinforcing or rigidity thereto.

The second handle member 96 is provided with a pair of parallel main support straps 98 interconnected at a mid-portion with a transverse support member 102 the outer ends thereof interconnected by an anchor connector member 112.

Figure 4:
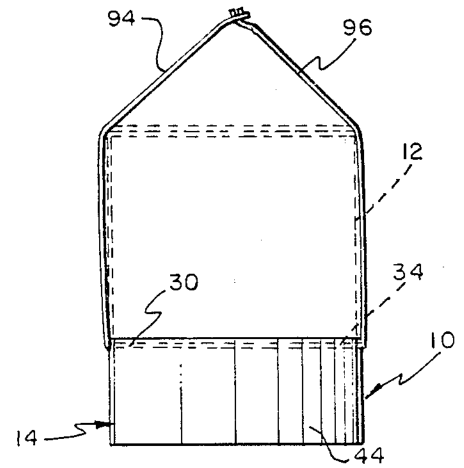
FIG. 4 is a rear elevational view of the paint supply well assembly of this invention illustrating a paint can in dotted lines and the support handle assembly in the connected condition.

The anchor connector member 112 provides a snap connector section and includes an anchor connector body 114 having an anchor member 116 of generally L-shape. The anchor member 116 includes an anchor body section 118 which resembles a protruding ridge structure which is adapted, when interconnected with the first handle member 94, to be received within the snap connector grooves 108 to hold the handle members 94, 96 together as shown in FIGS. 1 and 4.

As noted in FIG. 9, the details of the snap connections are so indicated to provide a handle means for transporting the entire paint supply well assembly 10 being easily disengaged by snap removal of the anchor member 116 from the snap connector grooves 108.

USE AND OPERATION OF THE INVENTION

In the use and operation of this invention, the paint supply well assembly 10 is adapted to be attached to an opened top area of a paint can member 12 and operable to receive the paint liquid from subject paint can member 12 within the main can support assembly 14 to be selectively discharged into the paint well assembly 16 for brush painting purposes.

The normal dispensing or utilizing of the paint liquid from a paint can member 12 is normally achieved by holding the paint can member 12 by its conventional pivotal handle member and using ones fingers and thumb to hold the handle member out of the way when dipping a paint brush therein. This results in loss of the paint liquid and, additionally, contaminating a person's hand holding either the paint can member 10 or the paint brush with this method of painting. An alternate method is to dispense the paint into a separate bucket but the same problems of loss of paint and contamination of brush and operator's hand is not overcome.

The first step of using the paint supply well assembly 10 is to take the paint can member 12, as shown in this preferred embodiment being a one gallon structure, whereupon the operator/user of this invention removes a sealing lid member therefrom in a conventional manner with the paint can placed on a support surface on its bottom wall.

Figure 2:
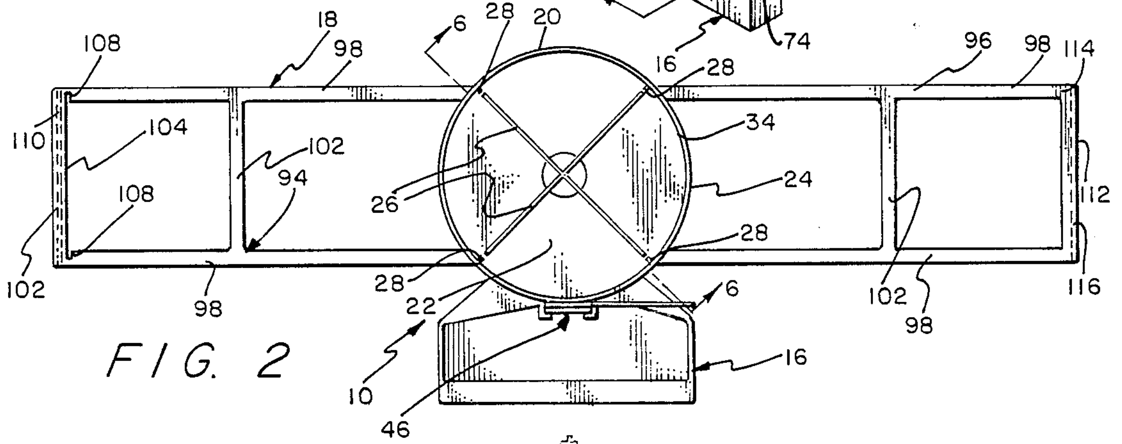
FIG. 2 is a top plan view of the paint supply well assembly of this invention having a support handle assembly in an opened disconnected condition.
Figure 3:
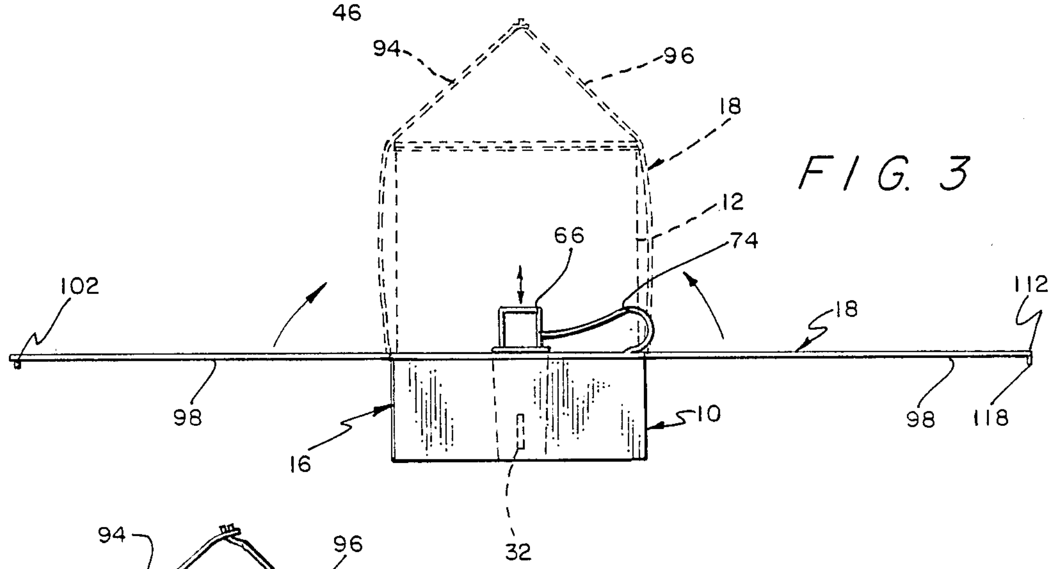
FIG. 3 is a side elevational view of the paint supply well assembly of this invention illustrating the paint can member and the support handle assembly in a connected condition in dotted lines.

The operator assures that the slide door member 76 is in a lower or closed position within the door slide members 68, 70 which forms a sealed connection about the discharge opening 32. The support handle assembly 18 is in the disconnected condition as shown in FIG. 2 and in solid lines in FIG. 3. The paint supply well assembly 10 is then inverted so as to have the upper connector section 30 of the sie wall member 34 placed about the outer peripheral of the opened top surface of the paint can member 12.

The operator or user then presses downwardly on the inverted bottom wall 22 of the can connector housing 20 so that the tapered portion 40 achieves a slight outward flexible movement into a sealed manner with the paint can member 12 on the can support section 34 of the side ridge members 28 as noted best in FIG. 5. This provides a firm snap-type seal with the upper connector section 30 of the side wall member 24 of the can connector housing 20.

Next, the operator can move the first handle member 24 and the second handle member 96 to an adjacent position for a snap connection of the connector support member 104 with the anchor connector member 112 as noted in FIG. 9. This results in a connecting means so as to resemble a generally U-shaped handle means whereupon the interconneted portions of the first and second handle members 94, 96 can be grasped for ease of conveyance of the interconnected paint can member 12 and the paint supply well assembly 10 which may be easily conveyed on a ladder or other areas of which a brush painting operation is to be achieved.

Continuing with a painting operation, the slide door member 66 can be grasped by the handle section 78 and moved upwardly within the door slide members 68, 70 to reveal a portion of the discharge opening 32. This permits liquid paint material 124, as noted in FIG. 5, to move outwardly into the paint receiving assembly 44 which then achieves a certain upper level as indicated by 126 in FIG. 5. This level 126 can be increased on further upward movement of the slide door member 66 as it will maintain a certain level therein depending on the vertical positioning of the slide door member 66.

On usage, it is obvious that the operator can dip a paint brush within the paint receiving assembly 44 for a painting operation and, additionally, the upper edge of the front wall 54 and the outer lip section 60 can be used for a brush wiping action due to the 90 degree edge formed therebetween as indicated by numeral 128. This is similar to a brush wiping action on an upper edge of the paint can member 12 but without the use of operation and novel results of this invention.

On completing a desired painting operation, the slide door member 66 can be moved downwardly as noted by an arrow 130 in FIG. 5. This causes, in conjunction with the biasing action of the upper flap portions 86 and the lower flap portions 88, a sealing action about the discharge opening 32 by the main body section 76 of the slide door member 66. At this time, the operator would utilize the remaining liquid paint material 124 within the paint receiving assembly 44. Next, the operator would, on finishing his painting operation, disconnect the anchor connector member 112 from the connector support member 104 so that the first and second handle members 94, 96 could be moved to the disconnected position as noted in FIG. 3. Then, the paint can member 12 with the paint supply well assembly 10 connected thereto would be rotated 180 degrees to the initial position being an upright paint can member 12. At this time, any of the liquid paint material 124 within the can connector housing 20 would move under gravity back into the confines of the paint can member 12.

After allowing for movement of subject liquid paint material 124, it is obvious that the paint supply well assembly 10 can be disconnected from the upper peripheral surface of the paint can member 12.

It is obvious that the entire paint supply well assembly 10 can be cleansed by water or turpentine depending on the liquid paint material 124 being used. It is obvious that the slide door member 66 could be removed from the parallel door slide members 68, 70 for cleansing purposes. The flexible anchor portion 80 assures that the main body section 76 is not accidentally lost which would render the entire paint supply well assembly 10 inoperative for future usage.

It is seen that the paint supply well assembly of this invention is readily attachable to a paint can member for the ease of a brush painting function with controlled dispensing of the liquid paint material therefrom. The paint supply well assembly can be constructed of various sizes for pint, quart, one gallon, and even five gallon paint containers but it is obvious that the preferred usage is normally for the one gallon paint can size although it could be utilized on one quart paint can members on proper sizing thereof.

The flow of liquid paint material to a certain level from a paint can member is controlled due to the force of gravity and a vaccum created in an upper bottom portion of the paint can member as it is being dispensed through the discharge opening into the paint well assembly. Therefore, the level of the liquid paint material within the paint receiving assembly is controlled by the particular positioning of the slide door member and depending on the amount of opening from the discharge opening revealed by the slide door member.

It is obvious that the supply well assembly of this invention can be used with liquids other than paint and containers other than paint cans.

The paint supply well assembly may be constructed of a plastic material for ease of cleansing; is economical to manufacture; being substantially maintenance free; and is easy to use.

While the invention has been described in conjunction with preferred specific embodiments thereof, it will be understood that this description is tended to illustrate and not to limit the scope of the invention, which is defined by the following claims.

I claim:

1. A paint supply well assembly adapted to be connected to an upper edge section of an opened paint can member having liquid paint material therein, comprising:

(a) a main can support assembly including a can connector housing having an open end to seal and receive the upper edge section of the paint can member thereon and a discharge opening;

(b) a paint well assembly having a door closure assembly connected to said main can support assembly through which a controlled amount of the liquid paint material is discharged from said discharge opening;

(c) said door closure assembly having a slide door member movable progressively from closed to opened positions to selectively control an amount and level of the liquid paint material in said paint well assembly available for brush painting purposes;

(d) said can connector housing having a bottom wall with an integral upright cylindrical side wall extended therefrom to define a container section to receive the liquid paint material therein for subsequent dispensing to said paint well assembly; and (e) said side wall member having a plurality of spaced vertically extended ridge members each having an upper can support section to jointly receive a top portion of the upper edge section of the paint can member to provide the necessary support therefore considering the weight of the liquid paint material contained within the paint can member.

2. A paint supply well assembly adapted to be connected to an upper edge section of an opened paint can member having liquid paint material therein, comprising:

(a) a main can support assembly including a can connector housing having an open end to seal and receive the upper edge section of the paint can member thereon and a discharge opening;

(b) a paint well assembly having a door closure assembly connected to said main can support assembly through which a controlled amount of the liquid paint material is discharged from said discharge opening;

(c) said door closure assembly having a slide door member movable progressively from closed to opened positions to selectively control an amount and level of the liquid paint material in said paint well assembly available for brush painting purposes;

(d) a support handle assembly having a first handle member and a second handle member, each with one end thereof secured to said main can support assembly for conveyance thereof; and (e) said first handle member and said second handle member each having upper outer ends thereof with connector members which are releasably engagable therebetween to form a handle means for conveyance purposes.

3. A paint supply well assembly as described in claim 2, wherein:

(a) said connector members including a connector support member at the outer end of said first handle member and an anchor connector member on the outer end of said second handle member which are releasably engagable and connectable to each other for transporting purposes.

4. A paint supply well assembly as described in claim 3, wherein:

(a) said connector support member having spaced snap connector grooves therein; and (b) said anchor connector member having an anchor member releasably engagable with said snap connector grooves for connecting to each other.

5. A supply well assembly adapted to be connected to an upper edge section of an opened container member having a liquid material therein, comprising:

(a) a main container support assembly, including a container connector housing, having an open end to seal and receive an opened end of the container member thereon and a discharge opening;

(b) a well assembly having a door closure assembly connected to said main container support assembly through which a controlled amount of the liquid material is discharged through said discharge opening;

(c) said door closure assembly having a slide door member movable progressively from closed to opened positions to selectively control an amount and level of the liquid material in said well assembly;

(d) said container connector housing having a bottom wall with an integral upright cylindrical side wall extended therefrom to define a container section to receive the liquid material therein for subsequent dispensing to said well well assembly; and (e) said side wall member having a plurality of spaced vertically extended ridge members each having an upper container support section to jointly receive a top portion of the upper edge section of the container member to provide the necessary support therefore considering the weight of the liquid material contained within the container member.

6. A supply well assembly as described in claim 5, wherein:

(a) said side wall member having an upper connector section with a tapered cylindrical portion so as to receive the upper edge section of the container member therein in a sealing manner so as to prevent the liquid material from leaking therebetween.

7. A supply well assembly as described in claim 5, wherein:

(a) a support handle assembly having a first handle member and a second handle member, each with one end thereof secured to said main container support assembly for conveyance thereof; and (b) said first handle member and second handle member each having upper outer ends thereof with connector members which are releasably engagable therebetween to form a handle means for conveyance purposes.

8. A supply well assembly as described in claim 7; wherein:

(a) said connector members including a connector support member at the outer end of said first handle member and an anchor connector member on the outer end of said second handle member which are releasably engagable and connectable to each other for transporting purposes.

9. A paint supply well assembly adapted to be connected to an upper edge section of an opened paint can member having liquid paint material therein, comprising:

(a) a main can support assembly including a can connector housing having an open end to seal and receive the upper edge section of the paint can member thereon and a discharge opening;

(b) a paint well assembly having a door closure assembly connected to said main can support assembly through which a controlled amount of the liquid paint material is discharged from said discharge opening;

(c) said door closure assembly having a slide door member movable progressively from closed to opened positions to selectively control an amount and level of the liquid paint material in said paint well assembly available for brush painting purposes;

(d) said door closure assembly includes a door support assembly with parallel spaced door slide members to receive said slide door member therein for movement between opened and closed positions for dispensing the liquid paint material therefrom;

(e) said main body section having a top ridge portion integral with a body portion; and (f) said body portion having an upper flap portion extended outwardly from said body section and engagable with said door slide members to achieve a sealing function.

10. A paint supply well assembly as described in claim 9, wherein:

(a) said body portion having lower flap sections engagable with a lower portion of said door support assembly for sealing purposes.

11. A paint supply well assembly as described in claim 9, wherein:

(a) said body portion having an upper flap portions extended outwardly from said body section and engagable with said parallel door slide members to achieve sealing function; and (b) said body portion having lower flap sections engagable with a lower portion of said door support assembly for sealing purposes.

12. A supply well assembly adapted to be connected to an upper edge section of an opened container member having a liquid material therein, comprising:

(a) a main container support assembly, including a container connector housing having an open end to seal and receive an opened end of the container member thereon and a discharge opening;

(b) a well assembly having a door closure assembly connected to said main container support assembly through which a controlled amount of the liquid material is discharged through said discharge opening;

(c) a support handle assembly having a first handle member and a second handle member, each with one end thereof secured to said main container support assembly for conveyance thereof; and (d) said first handle member and second handle member each having connector members which are releasably engagable therebetween to form a handle means for conveyance purposes.

13. A supply well assembly as described in claim 12, wherein:

(a) said door closure assembly having a slide door member movable progressively from closed to opened positions to selectively control an amount and desired level of the liquid material in said well assembly.

14. A supply well assembly as described in claim 12, wherein:

(a) said side wall member having an upper connector section with a tapered cylindrical portion so as to receive the upper edge section of the container member therein in an airtight sealing manner so as to prevent the liquid material from leaking therebetween and allows an adjusted level of the liquid material in said well assembly.

* * * * *